United States Patent
Ramesh et al.

(10) Patent No.: US 6,416,289 B1
(45) Date of Patent: Jul. 9, 2002

(54) AXIAL FLOW TURBINES

(75) Inventors: Odayarkoil N Ramesh, Cambridge; Howard P Hodson, Godmanchester; Neil W Harvey, Derby, all of (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/648,344

(22) Filed: Aug. 25, 2000

(30) Foreign Application Priority Data

Aug. 31, 1999 (GB) .............................................. 9920564

(51) Int. Cl.⁷ ................................................. F01D 5/14
(52) U.S. Cl. ...................................... 416/235; 415/914
(58) Field of Search ........................... 415/199.4, 199.5, 415/914; 416/198 R, 228, 235

(56) References Cited

U.S. PATENT DOCUMENTS

| | | | | |
|---|---|---|---|---|
| 1,903,823 A | * | 4/1933 | Lougheed ................ 416/241 R |
| 4,428,213 A | * | 1/1984 | Neal et al. ...................... 72/53 |
| 4,563,801 A | * | 1/1986 | Schill et al. ........... 29/156.8 B |
| 4,720,239 A | | 1/1988 | Owczarek |
| 4,776,765 A | * | 10/1988 | Sumner et al. ......... 416/241 R |
| 4,822,249 A | | 4/1989 | Eckardt |
| 5,209,644 A | * | 5/1993 | Dorman ....................... 416/235 |
| 5,313,700 A | * | 5/1994 | Dorman ..................... 29/889.7 |
| 6,095,755 A | * | 8/2000 | Houston ................. 416/241 R |

FOREIGN PATENT DOCUMENTS

GB  2 032 048 A  4/1980

* cited by examiner

*Primary Examiner*—F. Daniel Lopez
*Assistant Examiner*—James M McAleenan
(74) *Attorney, Agent, or Firm*—W. Warren Taltavull; Manelli, Denison & Selter PLLC (57) ABSTRACT

To reduce profile losses in the aerofoils of low pressure turbines of axial flow reaction turbines, the wake-passing effects on a row of aerofoils downstream of a first row of aerofoils are enhanced by providing a region of roughness on part of the suction surface of each aerofoil of the downstream row. The region of roughness has its leading edge between the location of the geometric throat on the suction surface and a location 75% of the surface perimeter from the leading edge. The region extends over at least 3% of the suction surface perimeter. The use of such a region of roughness is particularly effective in improving the performance of very high-lift aerofoils (coefficient of lift of 1.1 or greater).

10 Claims, 6 Drawing Sheets

Fig. 7. Comparison of calculated (inviscid) velocity distributions for conventional, high lift and very high lift LP turbine blading.

AXIAL FLOW TURBINES

FIELD OF THE INVENTION

This invention relates to axial flow turbines, whether driven by gas or steam, of the reaction type.

BACKGROUND OF THE INVENTION

Reaction type turbines have aerofoils with profiles that cause acceleration of the working fluid along at least a leading region of the suction surface of each aerofoil. The flow over that leading region is laminar but, depending upon the Reynolds number of the aerofoil airflow, the boundary layer further downstream may undergo a transition to turbulent flow and/or there may be transition or separation bubbles formed, which can result in large energy losses.

It is known to give aerofoil surfaces in a turbine, in particular in the low pressure output stages of a gas turbine, a transition-promoting configuration to reduce these losses. In U.S. Pat. No. 4,822,249 (Eckardt et al) a continuous spoiler edge is located closely behind the point of maximum surface velocity on the suction surfaces of the blades of a turbine wheel and extending over substantially the entire radial length of the blades. The function of the spoiler is to promote rapid transition from laminar to turbulent boundary layer flow on the suction surfaces without the formation of laminar separation bubbles. In GB 580806 (Griffith) it is proposed to roughen the entire aerofoil suction surface of reaction type blading for compressors and turbines so as to produce a very thin layer of more or less uniformly disturbed flow over that surface without disturbing the main flow beyond the boundary layer.

The topography of a surface with roughness is complex and there is no single definitive measure of roughness. A widely used basic perimeter is used "average roughness" (Ra), defined as the arithmetic average of the absolute values of the measured profile height deviations of the surface from the surface profile centreline within a given sampling length. This definition is also valid for previously used alternative terms "arithmetic average roughness" (AA) and "centreline average roughness" (CLA). Typical values of Ra for turbomachinery components are 125 microinches ($3.2 \times 10^{-3}$ mm) for material as cast and 25 microinches ($6.3 \times 10^{-4}$ mm) for polished components. Thus, in GB 580806, it has been proposed that the required roughening of the suction surface can be achieved by using sand-cast blades which are not given any polishing or smoothing treatment. In U.S. Pat. No. 5,209,644 (Dorman) which also proposes roughening aerofoils in the output turbine section of a gas turbine that operate in the range of exit Reynolds numbers of 80,000 to 200,000, the surface roughness is in the range 120 to 200 AA microinches ($3 \times 10^{-3}$ to $5 \times 10^{-3}$ mm). Here the roughening is applied to both the suction and pressure surfaces over the entire chord and over most of the aerofoil span and is intended to reduce separation of the boundary layer and formation of recirculation zones or bubbles in the boundary layer.

In the case of modern low pressure turbine blading which operates at low Reynolds numbers (e.g. 70,000–250,000) with highly loaded aerofoil sections, the formation of boundary layer separation bubbles towards the rear of the suction surface cannot be avoided. Steady flow design methodology focusses on ensuring that transition occurs within a bubble, causing it to reattach to the surface as a turbulent boundary layer before the aerofoil trailing edge.

Figure 1:
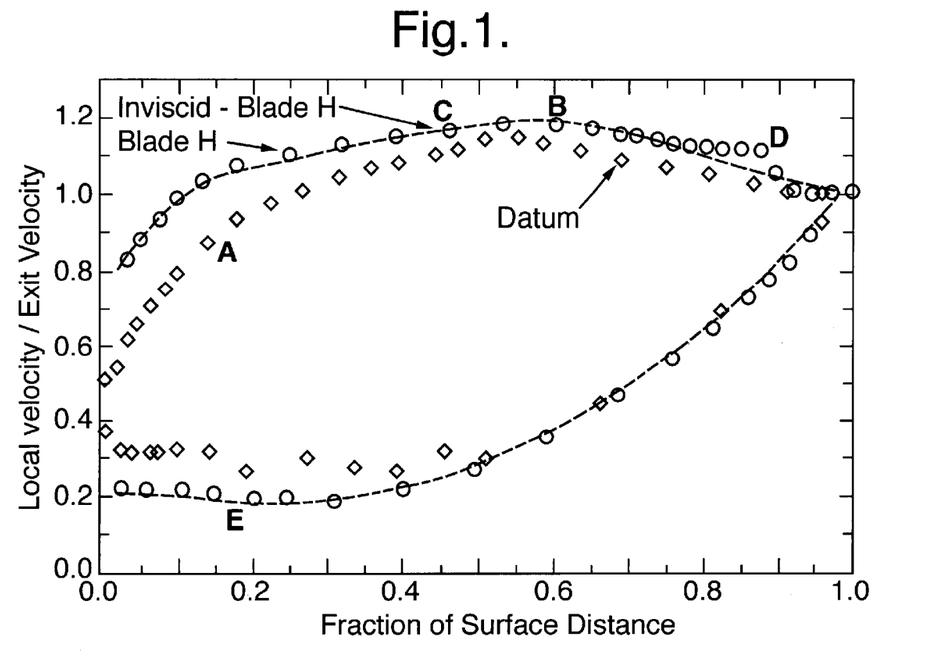
FIG. 1 is a graph showing a comparison of measured velocity distributions for conventional and high-lift low pressure turbine blading.

FIG. 1 shows the steady flow isentropic velocity distribution in an annular blading row for a conventional aerofoil (the diamonds plot) and for a high-lift aerofoil (the circles plot) having a lift coefficient approximately 20% greater than the conventional aerofoil. The ordinates are normalised velocities, that is to say, the ordinates are given by the ratio of local flow velocity to exit velocity, and the abscissae are chordal distances normalised as a fraction of the aerofoil chord length measured from the leading edge. The upper pair of plots are for the suction surface and the lower pair are for the pressure surface. A feature of the velocity distribution of high-lift aerofoils, such as that shown in FIG. 1 is the continuous acceleration of flow on the suction surface over the region A from the leading edge to a peak velocity point B typically downstream of the geometric throat in the blade row which will be located at C. The suction side boundary layer is laminar all the way to the peak velocity point B. Deceleration begins after the peak velocity point and in steady viscous flow the boundary layer separates shortly after the start of the deceleration, forming a separation bubble which shows as a plateau up to transition point D. Because transition is reached, the separation bubble reattaches before the trailing edge, resulting in a sharp pressure recovery.

The effectiveness of the high-lift aerofoil design relies on the reattachment of the bubble before the trailing edge because an open separation bubble gives very high losses. Reattachment of the bubble should not occur too early, because that allows unwanted growth of a turbulent boundary layer on the final region of the suction surface which also increases losses.

The preceding discussion, and prior art examples referred to above which seek to avoid the formation of separation bubbles, are all based upon a consideration of aerofoils operating in steady flow. However, in the typical turbine the flow is not steady. There is interaction between succeeding aerofoil rows because the wakes from one row will impinge periodically on the aerofoils of the succeeding row.

A comprehensive review of researches on wake passing effects on separation bubbles is given in "Blade Row Interactions in Low Pressure Turbines", H P Hodson, von Karman Institute Lecture Series 1998-02, Blade Row Interference Effects in Axial Flow Turbomachinery Stages (1998). The Hodson study considers high-lift, low Reynolds number aerofoils which have been developed for low pressure turbines in order to reduce weight and manufacturing costs. As already mentioned, these aerofoils have regions of significant deceleration on their suction surfaces which can result in the formation of substantial separation bubbles in the absence of wake-passing effects.

Figure 2:
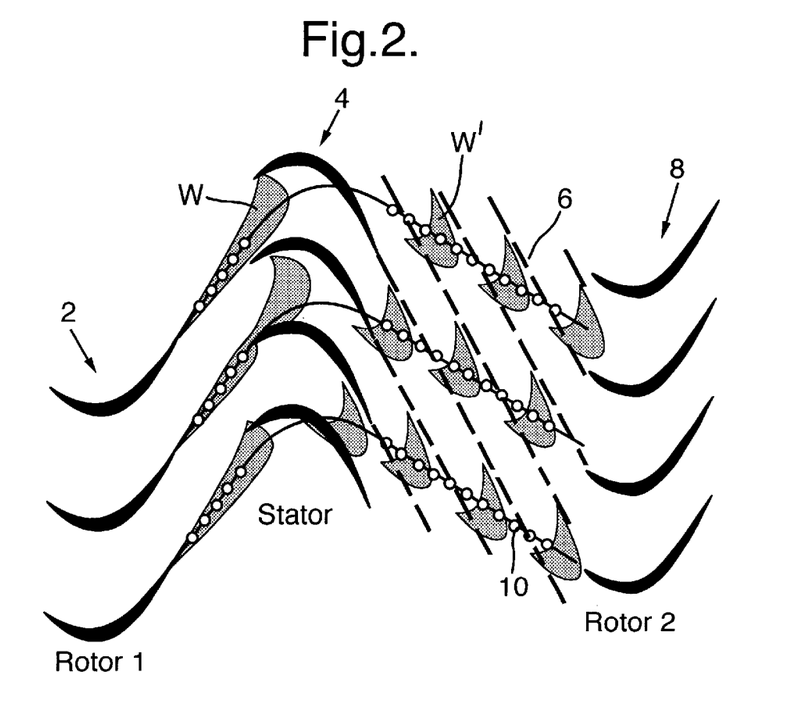
FIG. 2 illustrates wake passing effects in a multi-stage turbine.

The interaction between succeeding aerofoil rows in an axial flow turbine is shown schematically in FIG. 2 (Binder et al) which illustrates how the wakes are transmitted and distorted through downstream rows. The wakes W leaving a first rotor row 2 are chopped by the following stator row 4 and the chopped segments W' of the original wakes are further distorted in the flow through the stator row. The dashed lines 6 indicate the stator wakes. Relative to the moving aerofoils of the following rotor row 8, the wake segments are arranged in avenues 10, (indicated by the chains of circles) and if the second rotor row 8 has a different number of blades from the preceding rotor row 2, the respective avenues of wake segments will enter the second rotor row 8 at different phases to the blades of the row.

As is discussed in more detail in the Hodson study, turbulent flow appears in turbomachines typically by bypass transition because of the high levels of turbulence that exist. In this process at points within the boundary layer some distance from the leading edge turbulent spots can form and spread downstream and laterally. Immediately following the rear of a turbulent spot a calmed region is formed having laminar-like characteristics with a very full velocity profile, with a trailing edge travelling at about 30% of the freestream velocity. The unsteady flow of passing wakes can initiate this mechanism to have a beneficial influence on profile losses.

Figure 3:
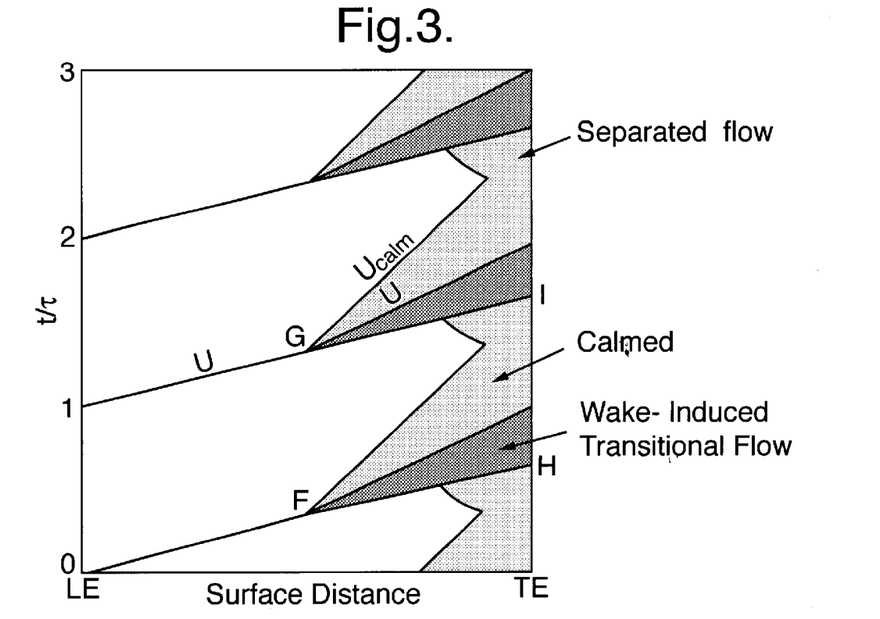
FIG. 3 is a time-distance diagram of wake-induced transition in the boundary layer of an aerofoil subjected to passing wakes.

The flow pattern at an optimum wake-passing frequency is illustrated in FIG. 3 which is a space-time diagram of the flow over an aerofoil in which the distance along the aerofoil chord from leading edge to trailing edge is given along the abscissa axis and time values (t/τ) given along the ordinate axis have been normalised by the period of wake passing (T) over the aerofoil.

On the leading part of the aerofoil, to the point of peak velocity, the boundary layer is laminar and is sufficiently stable not to be brought to transition by the wakes of a preceding aerofoil row.

In the steady flow condition described with reference to FIG. 1, beyond the peak velocity point the boundary layer will separate. However, turbulence in a passing wake can create a time-dependent transitional flow regime across the span of the aerofoil. This initiates the development of turbulent spots in the boundary layer transitional flow at each wake passing. Two successive turbulent spots are indicated at F and G. The front of the transitional flow travels at about 90% of the local freestream velocity and when it reaches the trailing edge the boundary layer is turbulent. This is at the point H for the turbulent spot initiated at F.

The rear of the transitional flow travels at only about 50% of the local freestream velocity, so that the chordwise extent and duration of the transitional flow increases as the trailing edge is approached. Furthermore, the transitional flow becomes fully turbulent so that each wake passing is associated with turbulent rather than transitional flow.

Behind each turbulent spot is a calmed region with effectively, laminar flow. The rear of this region travels at about 30% of the freestream velocity and continues to the aerofoil trailing edge. As it passes through the fully turbulent boundary layer, this turbulent region significantly reduces the skin friction locally to below the level of the surrounding, unaffected turbulent boundary layer.

With the optimum wake passing frequency of the regime in FIG. 3, the rear of the becalmed region from one wake reaches the aerofoil trailing edge at the same moment as the front of the turbulent spot initiated by the next wake. Thus, the point I represents both the arrival of the rear of the calmed region at the trailing edge and the arrival there of the front of the transitional flow initiated at the succeeding turbulent spot G. With this situation as shown in FIG. 3, minimum losses are generated by the suction surface boundary layer.

At the nominal separation location, once the calmed region has passed, the deceleration causes the laminar boundary layer to separate and the bubble gradually grows. However, it does not have time to develop fully as it continues only until the next turbulent spot, initiated by the next wake, suppresses it.

More recently, very high-lift aerofoil sections have been developed for low pressure turbine blading which are susceptible to greater profile losses if the boundary layer conditions are not controlled. Such aerofoil sections have a lift coefficient of 1.1 and above as compared with a lift coefficient of 1.0 for high-lift sections. It will be understood that these values relate to the designed normal operating condition within a range of conditions which the turbine might experience. In particular, in the case of aeroengines they usually refer to operation at cruise power The lift coefficient χ2 in cascade flow, assuming compressibility of the flow, is defined as $$\Psi_2 = \frac{S}{C_{AX}} \frac{\rho}{P'_o - P_e} Va(V_{w,e} - V_{w,is})$$

where the notation has the following meaning:

| | Notation |
|---|---|
| V | absolute velocity |
| ρ | static density |
| S | blade pitch |
| $P_o$ | stagnation pressure |
| P | static pressure |
| $C_{AX}$ | slope chord (see FIG. 4) |

| | Subscripts |
|---|---|
| is | values at blade inlet on mean stream surface |
| e | value at blade exit on mean stream surface |
| w | whirl component of velocity |
| a | axial component of velocity |

Superscript' Denotes Isentropic Conditions

Figure 4:
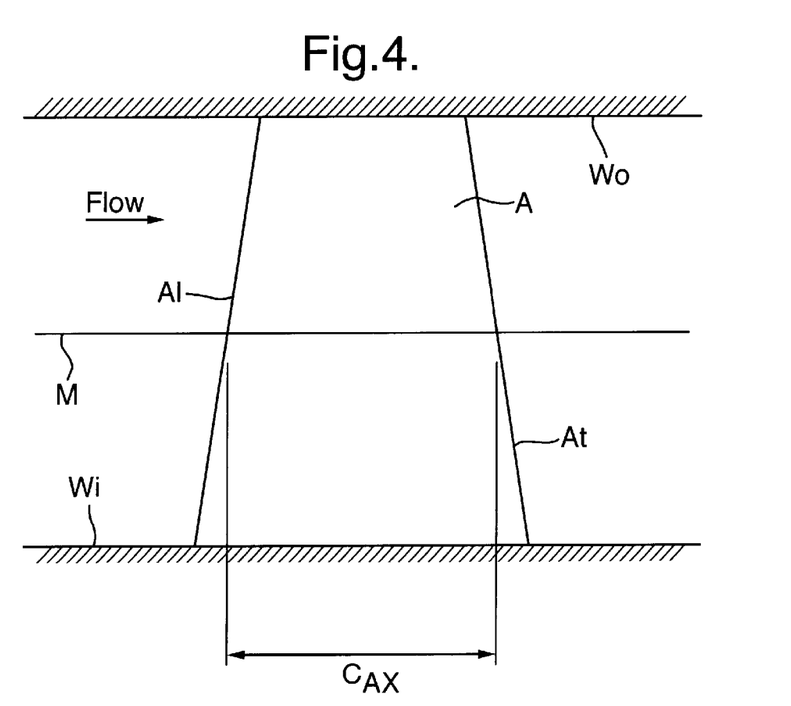
FIG. 4 is a diagram showing some of the parameters employed in defining the lift coefficient of an aerofoil in an annular cascade.

FIG. 4 shows, in relation to the radially inner and outer end walls $W_i, W_o$ of a turbine passage in which the aerofoil A operates, the axial chord ($C_{AX}$) between the leading and trailing edges of the aerofoil section at the mean stream surface.

If incompressible conditions can be assumed, the lift coefficient can be represented more simply as $$\Psi_2 = S2\cos^2 \beta_2 [\tan\beta_2 - \tan\beta_1] C_{AX}$$

where:
 $\beta_1$ is the inlet flow angle
 $\beta_2$ is the exit flow angle

The mechanism described above with reference to FIG. 3, in which an optimum wake passing frequency is chosen to reduce losses, is found to be inapplicable to very high-lift aerofoils. The greater deceleration over the rear part of the suction surface gives a larger separation bubble and transition would occur too late for reattachment. The potential profile losses are consequently greater.

There is therefore a need for an alternative solution in order to take advantage of very high-lift aerofoils the use of which could result in cost and weight benefits.

SUMMARY OF THE INVENTION

According to the present invention, an axial flow turbine is provided having downstream of a first row of aerofoils of the turbine, at least one further row of aerofoils in which a region of increased roughness is provided on the suction surface of each aerofoil, said region having an upstream boundary substantially between the location of the geometric throat on that surface and a location 75% of the suction surface perimeter from the leading edge and having an extent of at least 3% of said perimeter.

While this arrangement is able to improve the performance of very high lift aerofoils, the scope of the invention is not limited to such aerofoils. Aerofoils with lower lift characteristics may also experience problems of detachment of flow which, if due to delay of transition, can also be treated in accordance with the present invention.

Preferably, aerofoils according to the invention are designed to operate at a Reynolds number in the range of 10,000 to 250,000. As already mentioned, for aeronautical gas turbines, this typically relates to operation in the cruise condition as the predominant mode of operation.

The region of roughness is preferably not located substantially further forward than the peak velocity point of the aerofoil. For example it can have its leading edge in an area extending from the peak velocity point or from a position not substantially more than 5% of the suction surface perimeter downstream of the peak velocity point.

The aerofoils may, at least at one radial end zone, be operating in an end wall turbulent region, in which case, the region of roughness preferably terminates at or before said zone.

DETAILED DESCRIPTION OF THE INVENTION

By way of example, the invention will be further described with reference to FIGS. 5 to 8 of the drawings.

Figure 5:
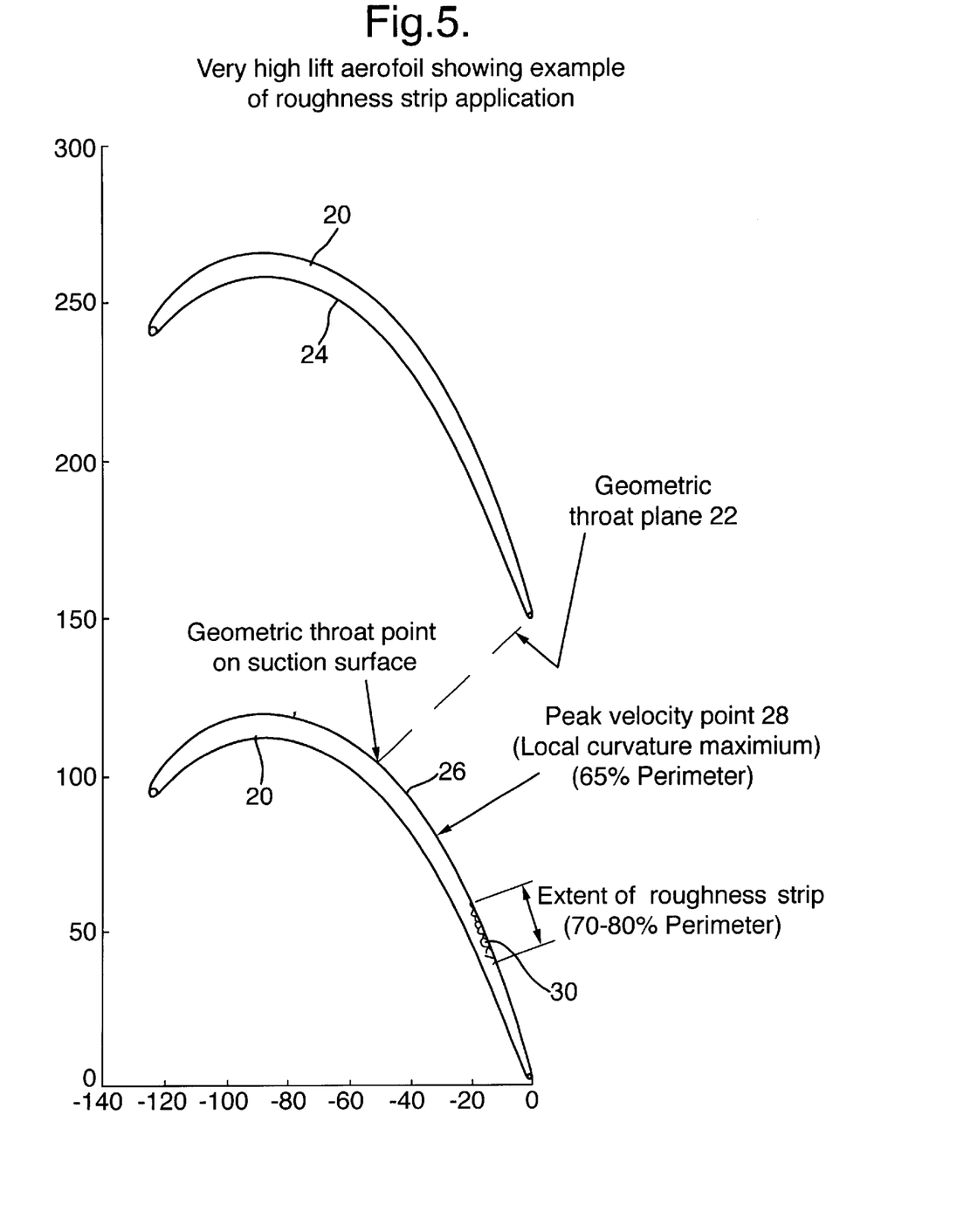
FIG. 5 is a sectional view of very high-lift turbine aerofoil sections in a low pressure turbine having a roughness region according to the invention.
Figure 6:
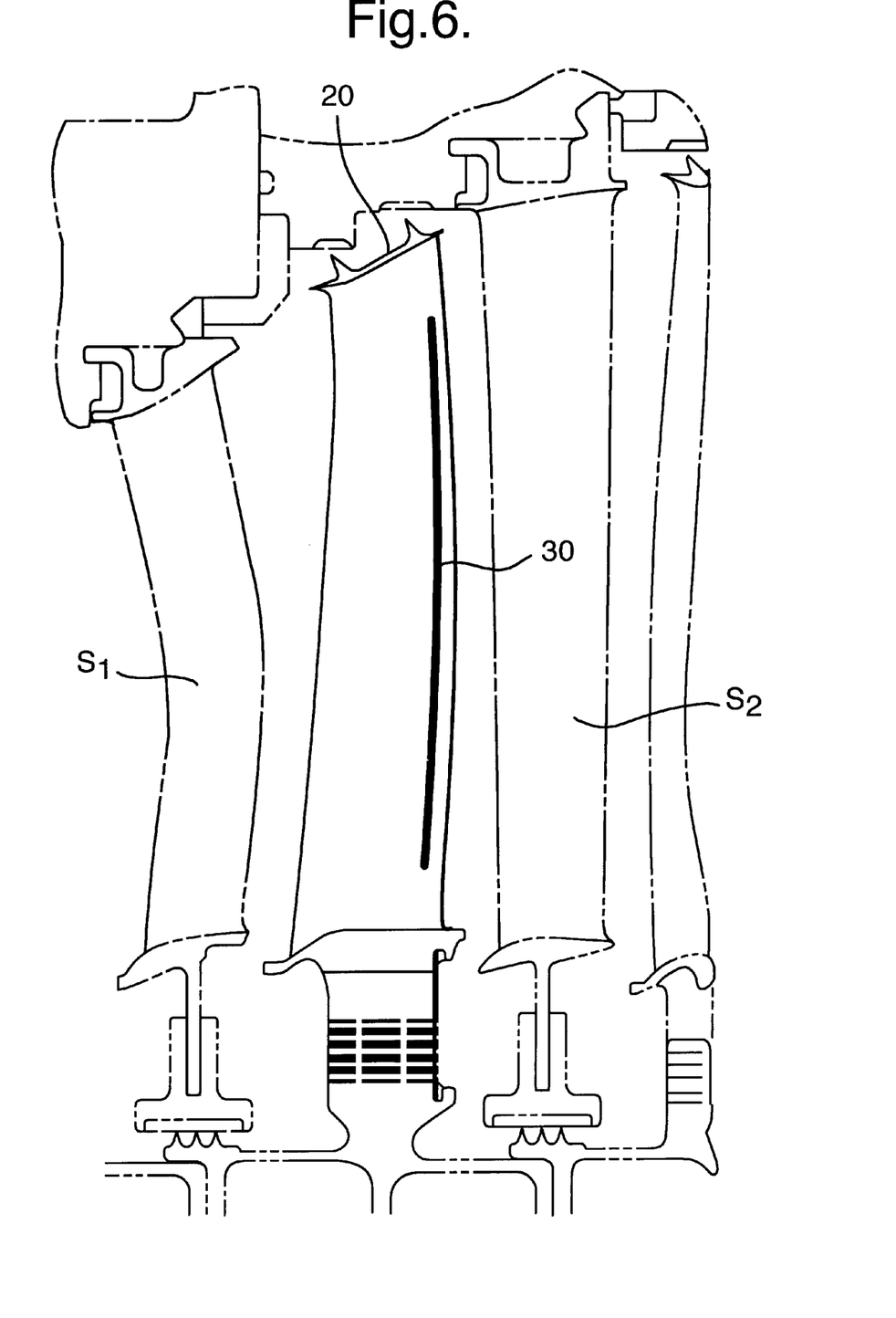
FIG. 6 is a fragmentary side view of the low pressure turbine in the direction VI in FIG. 5, showing the spanwise distribution of the roughness region.

FIG. 5 shows in section a pair of very high-lift blades 20 of an annular turbine blade row in a low pressure output turbine of an axial flow gas turbine. The drawing indicates the location, in the plane of the section, of a geometric throat 22 between the two aerofoils, ie. at the minimum distance between opposed pressure and suction surfaces 24,26 of the aerofoils. The geometric throat lies some distance upstream from the point 28 at which the velocity over the suction surface peaks. That peak velocity point 28 lies at substantially 65% of the suction surface perimeter from the leading edge. This rearward location of the peak velocity point, some 60% to 70% of the perimeter, is typical of both high-lift and very high-lift aerofoils. FIG. 6 shows the blades 20 in relation to its adjacent upstream and downstream stator rows $S_1, S_2$.

In steady flow, laminar boundary layer separation will occur on the suction surface 26 closely downstream of the peak velocity point 28, typically some 5% of the suction surface perimeter behind this location. Although separation occurs at a point similar to a high-lift aerofoil, the greater deceleration means that reattachment will not occur, resulting in open separation and consequently high losses.

In unsteady flow, wake passing effects on a very high-lift profile only partially suppress the laminar separation. The losses are therefore reduced, but not down to the levels obtained with high-lift aerofoils.

In accordance with the present invention, however a band of roughness in the form of a strip 30 is applied to the suction surface. It extends a major part of the span of the aerofoil, as can be seen in FIG. 6. The strip has a width occupying the region between 70% and 80% of the suction surface perimeter from the leading edge. It is found that the presence of such a roughness strip enhances turbulent spot generation, reinforcing the influence of the passing wakes to suppress the separation bubble, and also in some cases generating more calmed regions.

The band of roughness can have its leading edge further forwards, e.g. to lie substantially at the geometric throat, but some loss of the overall efficiency of the aerofoil will occur if it extends further forwards to any significant extent. Preferably, it begins at the peak velocity point, or further rearwards, up to 75% of the suction surface perimeter from the leading edge.

The band has a chordwise extent of at least 3% of the suction surface perimeter. It can extend rearwards to the trailing edge of the aerofoil, but preferably it terminates at a spacing from the trailing edge, e.g. at not substantially more than 90% of the suction surface perimeter from the leading edge.

It will be understood that the length of the suction surface perimeter may vary considerably over the radial span of an aerofoil, so that the band may not have a constant chordwise width but may taper along the radial span.

The band of roughness can extend along the complete span of the aerofoil, but it is generally preferred to terminate some distance short of the radial ends of the aerofoil, as shown in FIG. 6, in particular because it will have little beneficial effect where end wall flows predominate and because the spanwise spread of the transitional flows from turbulent spots will extend the effect of the roughness beyond the span of the band. For aerofoils having a low aspect ratio, therefore, limitation of the spanwise extent of the band may result in a zone of roughness that has its major dimension in the chordwise direction.

The use of the roughness band with very high-lift aerofoils is particularly effective in Reynolds numbers (based on true chord and exit conditions) in the range 70,000 to 250,000. Because the aerofoils can vary considerably in size in practice, the roughness is best characterised as a normalised value, namely the ratio of roughness (Ra) to the aerofoil true chord (c). The range of roughness (Ra/c) is $3 \times 10^{-5}$ to $1 \times 10^{-1}$ but we prefer it to be within the range $3 \times 10^{-5}$ to $3 \times 10^{-4}$. This may be compared with as-cast blade surfaces Ra/c values of $5-6 \times 10^{-5}$ and polished aerofoils with Ra/c values of about $1 \times 10^{-5}$.

Figure 7:
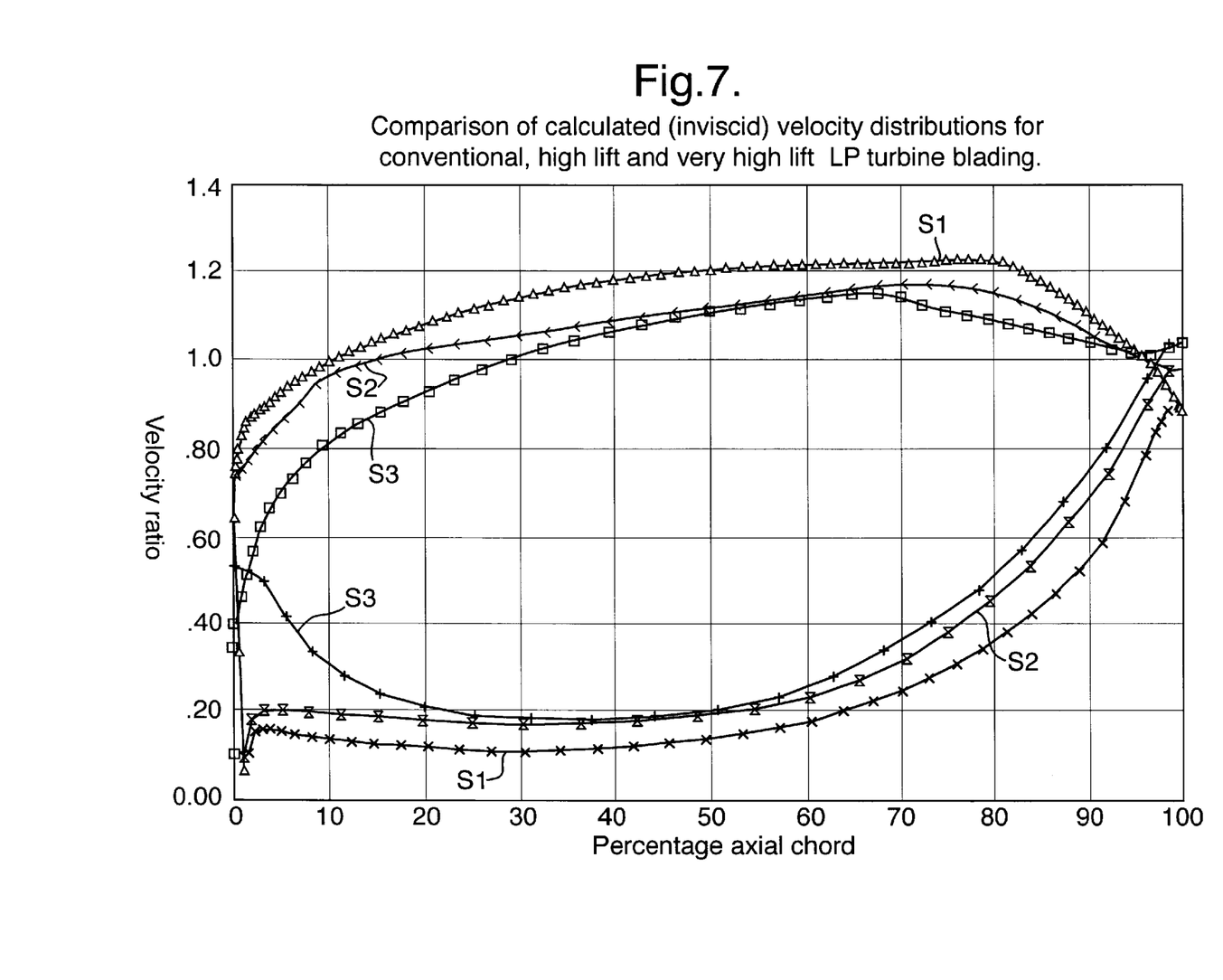
FIG. 7 is a graph similar to FIG. 1 but also showing velocity distributions for a very high-lift aerofoil.

Plotting velocity distributions against normalised chordal distances in the same manner as FIG. 1, FIG. 7 provides a comparison of the calculated, inviscid velocity distributions for a very high-lift aerofoil such as that shown in FIG. 4 in comparison with high-lift and conventional aerofoils. The suction surface velocity distributions are indicated as S1 (very high-lift), S2 (high-lift) and S3 (conventional) and the pressure surface velocity distributions are indicated as S1', S2' and S3'.

Figure 8:
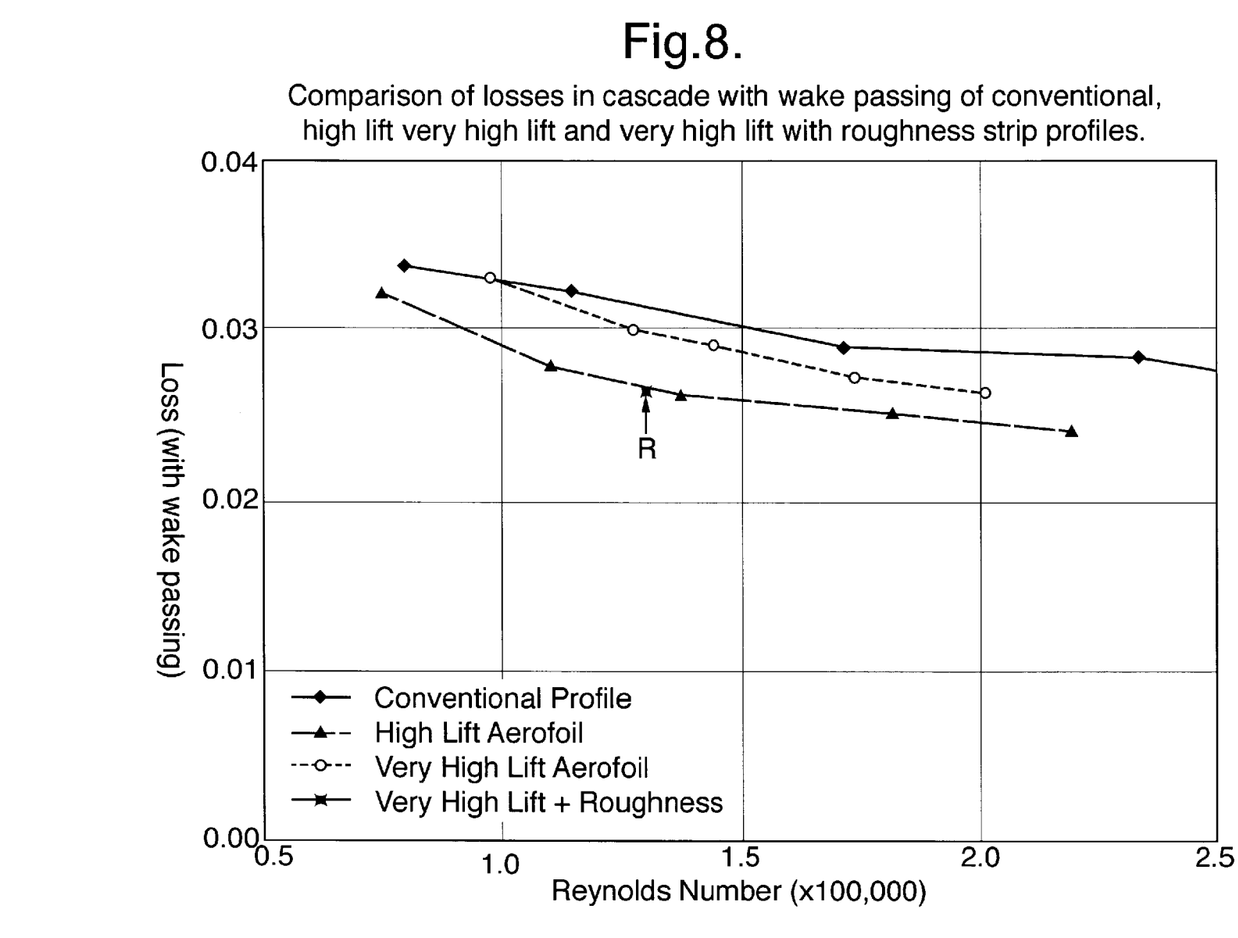
FIG. 8 is a graph showing comparative energy losses in cascades of different profile aerofoils.

A comparison of the losses occurring with wake passing effects on cascades of the different types of aerofoil is shown in FIG. 8. This indicates how optimising a high-lift aerofoil configuration reduces losses below those experienced by a conventional profile aerofoil in which the separation bubble reattaches. With a very high-lift aerofoil having a conventionally uniform suction surface, wake passing effects give some loss reduction but the larger deceleration and separation bubble towards the rear of the surface suppresses the beneficial effects of calmed regions forming behind turbulent spots generated by the wakes. As the experimental result R indicates, however, with the application of a roughness strip of the form described above, the losses from a very high-lift profile can be reduced to the same level as for the high-lift profile.

It will be understood that the invention is applicable to aerofoils both as rotor blades and as stator vanes of a turbine following the first row of aerofoils, since each row of aerofoils after the first will experience wake-passing effects.

We claim:

1. An axial flow turbine having downstream of a first row of aerofoils of the turbine, at least one further row of aerofoils each of which aerofoils being provided with a suction surface, a leading edge, and a trailing edge, adjacent aerofoils in said further row cooperating to define a geometric throat, said aerofoil suction surface being smooth except for a surface region having an increased roughness provided on said suction surface of each aerofoil, said region having an upstream boundary substantially between the location of the geometric throat on the suction surface and a location 75% of the suction surface perimeter from the leading edge and having an extent of at least 3% of said perimeter wherein the roughness (Ra) of said region, normalized to the aerofoil chord (Ra/C) is between $3\times10^{-5}$ to $1\times10^{-3}$.

2. An axial flow turbine according to claim 1 wherein said further row of aerofoils is a row in a low pressure output turbine of the axial flow turbine.

3. An axial flow turbine according to claim 1 wherein the aerofoils are arranged to operate at a Reynolds number in the range of 10,000 to 250,000.

4. An axial flow turbine according to claim 1 wherein the roughness region has a leading edge between limits substantially at the peak velocity point of each aerofoil in said at least one row and not substantially more than 5% of the suction surface perimeter downstream of the peak velocity point.

5. An axial flow turbine according to claim 1 wherein the roughness region lies within an area of the suction surface perimeter located substantially between limits at 70% and 80% of the total perimeter length from a leading edge of each aerofoil.

6. An axial flow turbine according to claim 1 wherein the roughness region terminates at a spacing from the trailing edge of each aerofoil of said at least one row.

7. An axial flow turbine according to claim 6 wherein the trailing edge of the roughness region lies at not substantially more than 90% of the suction surface perimeter from the leading edge.

8. An axial aerofoil flow according to claim 1 wherein the roughness terminates at a spacing from at least one radial end of each aerofoil of said at least one row.

9. An axial aerofoil flow according to claim 1 wherein said aerofoils are very high lift blading with a lift coefficient of at least substantially 1.1.

10. An axial flow turbine according to claim 1 wherein the roughness (Ra) of said region, normalised to the aerofoil chord (Ra/c) is between $3\times10^{-5}$ to $3\times10^{-4}$.

* * * * *